United States Patent Office 3,005,033
Patented Oct. 17, 1961

3,005,033
POLYMERIZATION OF OLEFINS
Robert M. Engelbrecht and Joseph Q. Snyder, El Dorado, Ark., assignors to Monsanto Chemical Company, St. Louis, Mo., a corporation of Delaware
No Drawing. Filed June 22, 1959, Ser. No. 821,689
6 Claims. (Cl. 260—683.15)

This invention relates to a nickel oxide-silica-alumina catalyst promoted with a lithium compound and to a process for polymerizing olefins in the presence of this catalyst.

The polymerization of olefins in the presence of a nickel oxide-silica-alumina catalyst is well known in the art. The art also discloses that if the conventional nickel oxide-silica-alumina catalyst is promoted with from about 0.05 to about 5 weight percent of an alkaline compound, in particular an alkali metal alkaline compound, the production of 1-olefins from the polymerization of olefins is enhanced. While these catalysts are useful in the polymerization of olefins, their utility could be significantly increased if the life of the catalyst could be increased.

It is an object of this invention to provide an improved catalyst having particular utility in the polymerization of olefins. It is also an object of this invention to provide an improved process for the polymerization of olefins. Additional objects will become apparent from the description of this invention.

It has now been discovered that the catalyst life of the conventional nickel oxide-silica-alumina catalyst can be significantly and most unexpectedly increased by promoting the catalyst with a very minor amount of a lithium compound convertible to lithium oxide upon heating. The novel catalysts of this invention comprise nickel oxide-silica-alumina containing from 0.001 to 0.04 weight percent, calculated as lithium oxide, of a lithium compound convertible to lithium oxide upon heating. The novel catalyst of this invention exhibits exceptional utility for the polymerization of polymerizable olefins. Accordingly, this invention provides a process for polymerizing polymerizable olefins which comprises contacting at least one of said olefins with a catalyst comprising nickel oxide-silica-alumina containing from 0.001 to 0.04 weight percent, calculated as lithium oxide, of a lithium compound convertible to lithium oxide upon heating.

As a comparative illustration of this invention catalysts were prepared as follows:

Nickel oxide-silica-alumina catalyst: 61.4 grams of nickel nitrate hexahydrate were dissolved in 156 cc. of water. This nickel nitrate solution was slurried with 300 grams of pelleted silica-alumina (87.3% $SiO_2$ by weight and 12.4% $Al_2O_3$ by weight) until all the solution was evenly distributed on the silica-alumina support. This catalyst was dried in an oven (air atmosphere) overnight at 200° C. The dried catalyst was then transferred to a muffle furnace (air atmosphere) and calcined overnight at 550° C. After cooling in a desiccator the catalyst was ready for polymerization studies.

Lithium oxide-nickel oxide-silica-alumina catalyst: 61.4 grams of nickel nitrate hexahydrate and 0.145 gram of lithium nitrate were dissolved in 150 cc. of water. The resulting solution was slurried with 300 grams of pelleted silica-alumina (87.3% $SiO_2$ by weight and 12.4% $Al_2O_3$ by weight) until all the solution was evenly distributed on the catalyst. The drying and calcining procedures for this catalyst were the same as those described above.

Polymerization reactors were charged with each of these catalysts and propylene-containing hydrocarbon streams (from 50 to 75 weight percent propylene with the balance being primarily propane and other paraffins) passed through the catalyst beds under the polymerizing conditions and with the results set forth in the following Table A:

Table A

| | Run 1 | Run 2 |
|---|---|---|
| Catalyst | 0.01% $Li_2O$<br>5.0% NiO<br>83.1% $SiO_2$<br>11.8% $Al_2O_3$ | 5.0% NiO.<br>83.1% $SiO_2$.<br>11.8% $Al_2O_3$. |
| Reaction Temperature | 100° C. max | 100° C. max. |
| Pressure | 750 p.s.i.g | 750 p.s.i.g. |
| Space Velocity | 0.5 g. $C_3H_6$/g. cat./hr | 0.2 g. $C_3H_6$/g. cat./hr. |
| Conversion to Liquid Product | 90% | 75%. |
| Liquid Product: | | |
| $C_6$ olefins | 34.7% | 40.6%. |
| $C_9$ olefins | 30.0% | 29.0%. |
| $C_{12}$ olefins | 15.4% | 11.8%. |
| $C_{15}$ olefins | 7.3% | 4.7%. |
| Higher olefins | 4.7% | 2.1%. |
| Catalyst Life | 7.3 gal of product per lb. of catalyst. | 1.4 gal of product per lb. of catalyst. |

The conversions set forth in the preceding table represent the overall conversions obtained from the beginning of the run to the point where the conversion began to fall off rapidly. The runs were stopped when the conversion dropped to 50% of the propylene in the feed. Catalyst life was determined at this point. The lithium oxide promoted catalyst had a significant greater catalyst life than did the unpromoted catalyst.

When catalyst activity had dropped to 50% propylene conversion at 100° C., the catalysts were regenerated. Both catalysts were regenerated in the following manner: Air, dried over a molecular sieve, was pulled over the catalyst bed by applying a vacuum to the bottom of the reactor. With this air stream over the catalyst, the catalyst bed was heated to 300° C. (temperature raised slowly). A temperature of 300° C. was maintained until nothing condensed out of the effluent air stream. Then, with the air stream still going over the catalyst, the bed temperature was slowly taken to 550° C. and held at this temperature overnight. After the overnight heating at 550° C., the heating was discontinued and the catalyst bed was cooled to below 200° C. with the air stream. A stream of propane was then used to bring the bed to room temperature. The catalyst at this point was again used for polymerization.

The results obtained when polymerization was continued using the regenerated catalyst are set forth in Table B:

Table B

| | Run 1 | Run 2 |
|---|---|---|
| Catalyst | Regenerated catalyst of Run 1, Table A. | Regenerated catalyst of Run 2, Table A. |
| Reaction Temperature | 100° C. max | 100° C. max. |
| Pressure | 750 p.s.i.g | 750 p.s.i.g. |
| Space Velocity | 0.2 g. $C_3H_6$/g. Cat./hr | 0.2 g. $C_3H_6$/g. Cat./hr. |
| Conversion to Liquid | 90% | 85%. |
| Liquid Product: | | |
| $C_6$ olefins | 30.4% | 21.6%. |
| $C_9$ olefins | 32.0% | 33.0%. |
| $C_{12}$ olefins | 17.5% | 16.9%. |
| $C_{15}$ olefins | 12.0% | 10.2%. |
| Higher olefins | 7.9% | 7.3%. |
| Catalyst life | 16.0 gal. of product per lb. of catalyst. | Less than 2.0 gal. of product per lb. of catalyst. |

Again, catalyst life of the promoted catalyst of this invention was significantly greater than the catalyst life of the unpromoted catalyst. It is to be noted that at these extremely low concentrations of the alkaline compound of lithium in the nickel oxide-silica-alumina catalyst, only catalyst life appears to be effected. No significant differences were noted in the product of the polymerization reaction as obtained with the promoted catalyst when compared with the products of polymerization obtained with the unpromoted catalyst.

In preparing the promoted catalysts of this invention, the lithium compound convertible to lithium oxide upon heating is incorporated into the catalyst in the range of from about 0.001 to 0.04 weight percent, calculated as lithium oxide, and preferably in the range of from about 0.005 to 0.03 weight percent, calculated as lithium oxide. The lithium compound may be incorporated into the catalyst in the form of various compounds such as the nitrate, hydroxide, acetate, sulfate, carbonate and the like. It is believed that these compounds are converted, at least in part to the oxide during the preparation and/or use of the catalyst. The total amount of nickel oxide incorporated into the catalyst ranges from 0.1 to 10% by weight or higher, based upon the weight of the finished catalyst. The silica-alumina support for the alkaline material and nickel oxide preferably contains predominantly silica as a base constituent which is preferably in the range of 50 to 99% by weight of the support. The alumina content preferably ranges from 1 to 50 weight percent. A silica-alumina base of any range of these components is operable in this invention.

The catalyst of this invention may be prepared by methods well known to those skilled in the art, such as by impregnation and the like. When preparing the catalyst by impregnation, the carrier in the form of powder, granules or pellets, is immersed in an aqueous solution of suitable soluble salts of lithium and nickel, whereupon the carrier absorbs a portion of the solution. The impregnation may be performed using separate solutions of the nickel and lithium compound, but the catalytic material formed is preferably dried before being impregnated with the second solution. A catalyst composition formed by any method is dried at a temperature in the range of 150°–400° C. and then calcined in an oxygen-containing atmosphere at a temperature in the range of 450°–600° C. for a period of time of at least three hours and preferably longer to reduce the water content of the material and to assure that the nickel is present as the oxide. During calcination, the lithium compound is converted at least in part to the oxide. The catalyst of this invention can also be prepared from commercially available nickel oxide-silica-alumina catalyst by impregnating the commercial catalyst with a solution of a lithium salt.

While the novel catalyst of this invention is particularly suited as a catalyst for the polymerization of olefins, it can also be utilized as a hydrogenation catalyst and as an isomerization catalyst.

Polymerization reactions utilizing the novel catalyst of this invention can be performed with a wide variety of polymerizable olefins, such as the type which are to be found in refinery gases. The catalyst of this invention is particularly well suited to the polymerization of olefins containing from 2 to 6 carbon atoms as, for example, propylene, ethylene, butylenes, pentenes and hexenes. olefins of higher molecular weight can also be polymerized utilizing the novel catalyst of this invention. The polymerization reaction can be carried out over a rather wide temperature range. Generally it is carried out at an elevated temperature. Temperatures in the range of from about 50° C. to about 150° C. are particularly useful although much higher temperatures can be used if desired. According to the process of this invention polymerizations are best carried out in the liquid phase, although they can be carried out in the vapor phase if desired. The reaction is generally carried out at superatmospheric pressures. Pressures from about 500 p.s.i.g. to 2000 p.s.i.g. are particularly useful and much higher pressures can be used if desired. It is generally desired that the polymerization reaction be carried out in the presence of an inert diluent. Normal paraffins and cyclo paraffins are particularly preferred as inert diluents. Generally, the olefin-containing hydrocarbon feed stream contains from about 20% to about 70% by weight of the polymerizable olefin. In the polymerization, the liquid space velocity of the polymerizable olefin can be substantially varied. Space velocities of the order of 0.3 gram of olefin per gram of catalyst per hour have been found particularly useful. At times, space velocities as low as 0.05 and as high as 2.0 can be used if desired.

The catalysts of this invention are of the regenerative type and when their catalytic polymerization activity drops to any predetermined point they can be regenerated by any of the techniques well known to those skilled in the art. Preferably they are regenerated by heating to elevated temperatures in excess of 450° C. in the presence of an oxygen containing gas.

The novel catalyst disclosed in this application are claimed in copending application Serial No. 821,691, filed June 22, 1959.

What is claimed is:

1. A process for polymerizing polymerizable olefins which comprises contacting at least one of said olefins with a catalyst consisting essentially of nickel oxide-silica-alumina containing from 0.001 to 0.04 weight percent, calculated as lithium oxide, of a lithium compound convertible to lithium oxide upon heating.

2. A process for polymerizing polymerizable olefins which comprises contacting an olefin-containing hydrocarbon feed stream, wherein said olefin contains from 2 to 6 carbon atoms, with a catalyst consisting essentially of nickel oxide-silica-alumina containing from 0.001 to 0.04 weight percent, calculated as lithium oxide, of a lithium compound convertible to lithium oxide upon heating.

3. The process as described in claim 2 wherein the olefin-containing hydrocarbon feed stream contains the olefin in an amount ranging from about 20% to about 70% by weight of total composition.

4. The process as described in claim 3 wherein the olefin is propylene.

5. The process as described in claim 4 wherein the reaction is carried out in the liquid phase and at a temperature in the range of from about 50° C. to about 150° C.

6. The process as described in claim 5 wherein the catalyst consists of nickel oxide-silica-alumina containing from about 0.005 to 0.03 weight percent, calculated as lithium oxide, of a lithium compound convertible to lithium oxide upon heating.

References Cited in the file of this patent

UNITED STATES PATENTS 2,881,233   Clark ------------------ Apr. 7, 1959